United States Patent Office 2,751,367
Patented June 19, 1956

2,751,367

FRIABLE POLYACRYLATE POWDERS

John F. Yost, Noroton Heights, and Ilse B. Frederick, Glenbrook, Conn., assignors to American Cyanamid Company, New York, N. Y., a corporation of Maine No Drawing. Application June 14, 1952,
Serial No. 293,662

5 Claims. (Cl. 260—41)

The present invention relates to compositions containing polyacrylic compounds and having improved friability in the presence of moisture, and particularly of hydrolyzed polyacrylonitrile in contact with moist soil.

Polyacrylate salts, especially those derived by hydrolysis or saponification of polyacrylonitrile, are increasing in commercial importance, particularly for the purpose of conditioning or improving the structure of soil by aggregating the soil into pellets with a particle size of approximately $\frac{1}{16}$ to $\frac{1}{2}''$. The polyacrylic compounds in dry or powdered form are not easy to handle when deposited on soil. These substances quickly absorb moisture and turn into relatively large sticky and unmanageable masses. Consequently the person applying the soil conditioner has little or no time to mix it with the soil particles. It has been suggested that such materials should only be applied to dry soils but this is not a satisfactory solution because all soil suitable for cultivation contains appreciable amounts of moisture and also because of the limited utility of materials which could only be applied after a sustained period of dry weather. There is widespread demand for suitable soil conditioners for dry application which are not subject to the limitations mentioned. This is especially true since the dry application is the only suitable method for heavy treatments particularly for treatment of soil to a depth of several inches or more.

An object of the invention is to provide compositions containing reaction products of relatively strong bases with polyacrylic compounds which remain friable in the presence of moisture.

Another object of the invention is to provide moisture-resistant friable compositions containing the polyacrylate salts of relatively strong bases.

A further object of the invention is to provide moisture-resistant friable compositions containing hydrolyzed polyacrylonitrile.

Other objects and advantages of the invention will be apparent to those skilled in the art especially from the detailed description and examples set forth hereinbelow.

The present invention concerns compositions comprising 100 parts by weight of the reaction product having a molecular weight above about 88,000 of a polyacrylic compound and a relatively strong base in admixture with at least 50 parts of inert powdered solids having a water absorbency of at least 42% by weight and a compacted dry bulk density less than 30 pounds per cubic foot. Other aspects of the invention relate to the addition of dense solids to promote flowability and also certain polyoxyalkylene esters.

The improved compositions of the present invention involve the reaction products of polymerized acrylic acid, acrylonitrile acrylamide or lower alkyl acrylates with relatively strong monovalent bases. These bases should have a dissociation constant of at least $1.8 \times 10^{-5}$ at 25° C. This includes ammonium hydroxide as well as the alkaline compounds of sodium and potassium such as the hydroxides and carbonates. The degree of polymerization of the product is important as those below about 88,000 are inferior as soil conditioners. The soil conditioning qualities of the acrylic polymer improve as the molecular weight increases but the cost of manufacturing such polymers also rises. Above about 530,000 the polyacrylic substance must be reacted in such dilute form that the cost is out of line for the desired purposes because of the large volume of water handled and later driven off in the drying stage.

While the above limit is the best approximate measurement of actual molecular weight possible at the present time, it is realized that uncertainty still exists as to the accuracy of the molecular weight determinations of such polymers. Accordingly, it is preferable to define the degree of polymerization of the preferred polymer, hydrolyzed polyacrylonitrile, in terms of the specific viscosity of the acrylonitrile polymer prior to hydrolysis with the base. This value is obtained from viscosity measurements of a solution of 1 gram of the polymer made up to 100 ml. with any suitable solvent and calculation from the following equation:

$$N_{sp} = \text{specific viscosity} = \frac{\text{viscosity of solution}}{\text{viscosity of solvent}} - 1$$

From this the molecular weight may be calculated by the Staudinger equation:

$$\text{Molecular weight} = \frac{N_{sp}}{K_m C}$$

wherein $$K_m = 1.5 \times 10^{-4}$$

and $C$ = concentration of the solution expressed as number of mols of the monomer (calculated) per liter of solution.

Specific viscosities of 1.5 and 9.0 respectively correspond to molecular weights of 53,000 and 318,000 (Staudinger) for acrylonitrile polymers according to the best available present information. During hydrolysis or saponification in the manner set forth below it is probable that an average of about 75% of the nitrile radicals are converted into —COONa groups with much or all of the balance of the nitrile group being converted into amido radicals. There is no reason to believe that any polymerization or polymer degradation occurs during this reaction; accordingly, the acrylonitrile polymers of 1.5 and 9.0 specific viscosities are converted into hydrolyzed polyacrylonitriles having a molecular weight of about 88,000 and about 530,000 respectively as may easily be computed after assuming the conversion of 75% of the nitrile group —COONa radicals and 25% into —CONH$_2$ groups. From the above, it is apparent that the molecular weight of the final polyacrylonitrile salt is controlled by the polymerization of the acrylic monomer. However, such polymerizations and their control are well known and form no part of the present invention, therefore they are not described herein. It will, of course, be realized that all of the polyacrylic compounds discussed herein are actually mixtures of polymers and that the stated molecular weights are averages for the mixtures. The polyacrylate salts obtained by reacting sodium hydroxide or other relatively strong bases with polymeric acrylic acid, its lower alkyl esters and acrylamide are essentially sodium polyacrylates, etc. containing an even higher proportion of —COONa groups than hydrolyzed polyacrylonitrile. These substances are equivalents for the present purposes of hydrolyzed polyacrylonitrile of approximately the same molecular weight; however, the latter is preferred for the compositions of this invention inasmuch as it is cheaper and easier to prepare. In connection with the polyacrylic esters the expression "lower alkyl" is used herein to denote alkyl radicals containing from 1 to 4 carbon atoms, that is, ethyl, methyl, propyl and butyl esters.

In the hydrolysis or saponification of the acrylonitrile polymer the degree of hydrolysis may vary from about 50% up to complete hydrolysis. Hydrolysis is accomplished by mixing an aqueous slurry containing 12 or 13% of the polymer by weight with a 50% aqueous solution containing 0.8 mol of sodium hydroxide for each mol of acrylonitrile calculated as the monomer. The mixture is reacted at about 95° C. with continuous stirring. The degree of hydrolysis of the resulting product is between 75 and 85% which is within the preferred range of 65 to 85% hydrolysis. This material contains a considerable quantity of free alkali and the addition of any suitable acid, such as sulfuric acid, is recommended in sufficient amount to neutralize the pH of a 5% solution to between 7 and 11 in order to reduce the possibility of skin irritation in handling the material. Finally the viscous solution containing about 20% solids is dried and the product ground to the desired fineness.

Polyacrylic substances of the type described above are mixed with one or more of a large variety of light, inert, non-tacky, highly sorptive, powdered solids of the proper physical characteristics. These powders must be very light, that is have a compacted dry bulk density lower than about 30 pounds per cubic foot and the preferred materials are lighter than 25 pounds per cubic foot. A suitable method of determining the compacted bulk density, which is also known as a tapped bulk density and settled density, is to loosely fill a 200 ml. graduate of about 1⅞" internal diameter to its top mark with the dry powdered material, and repeatedly strike the bottom of the graduate sharply on a wooden table from a height of about 1". This is continued until the upper level of the powder reaches a constant level, then a reading of the compacted or settled volume of the sample is taken and the tared graduate is weighed to determine the weight of the powder sample. The tapped bulk density is easily computed from the settled volume and weight of the sample.

The powdered material must also be capable of absorbing a large amount of moisture, for example at least 42% and the better materials have at least 50% water absorbency by weight as determined by the modified Gardner-Coleman test. All water absorbency values set forth in this specification are expressed in terms of the aforesaid test and it should be noted that the percentage water absorbency in this test is based on the total rather than the dry weight of the wet solids; thus a material of 50% water absorbency is one which will absorb a quantity of moisture equal to its own dry weight. The modified Gardner-Coleman absorbency test is carried out by adding water to a 10 gram sample of the powdered material while employing constant agitation. Water is added at a moderate rate to minimize errors due to evaporation losses and is continued until a sticky, pasty mass is formed in which it is barely possible to discern the separation of water. The moisture absorption is the percent by weight of water in the total mixture.

The material should be nontacky so that it will not form any gummy masses and also inert, at least to the extent that it will not react with the polyacrylic salt. It is thought that this fine light powder adheres to the particles of the polyacrylic compound as a covering which is far more water absorbent than the polymer so that it tends to pick up moisture in contact therewith first and thus delay the moisture from reaching and gelling the acrylic polymer. Apparently the powder has no pronounced tendency to condense or extract moisture vapor from the atmosphere. At any rate properly proportioned mixtures will remain friable on moist soil for many times as long as the undiluted polyacrylate salt and this allows ample time for thoroughly mixing the soil conditioning material with the soil either manually or with mechanical equipment.

According to the present invention at least 50 parts of the highly sorptive, light powder should be mixed with each 100 parts by weight of the polyacrylic compound. There is no critical upper limit for the quantity of the inert powdered solids except that it is uneconomical to mix and ship huge quantities of an inert material. Since very light or fluffy powders do not pour or flow well, excessive quantities of such materials may also introduce minor problems in handling the mixture of powder and polyacrylate salt. All or a preponderant proportion of the powdered solids should be mixed with the dry particles of the polyacrylic substance to secure the desired effects; however a minor proportion may be added to the solution or dispersion of polyacrylate salt prior to drying the salt. It has been found that this increases the production of drum driers entirely out of proportion to the quantity of powder added to the solution or dispersion. However, the drying of such mixtures as well as those containing a polyoxyalkylene ester of a fatty acid form no part of the present invention but are described in detail and claimed in our concurrently filed copending application Serial No. 293,663, now U. S. Patent 2,701,391.

It will be noted that the highly sorptive, light, powdered solids are described in connection with their physical rather than chemical characteristics. The reason is that the high sorptivity and low bulk density rather than chemical composition are the criteria for determining which materials will achieve the desired results. For example, montmorillonites having the characteristics specified herein provide excellent friability in the presence of moisture, whereas other montmorillonites having the same chemical and mineralogical classifications have proven substantially useless for the purpose. In general, it may be stated that the diatomaceous or infusorial earths have provided outstanding protection against gelation of the polymer under field conditions.

As an optional ingredient of the mixtures set forth herein inert, nontacky, free flowing, dense solids are usually desirable in order to render the mixtures free flowing. These dense materials should have a compacted dry bulk density in excess of 30 pounds per cubic foot and preferably at least 45 pounds per cubic foot. There is no significant upper limit since it appears that the heavier or denser the agent is, the better the flowability. These materials have no appreciable effect on the friability of the product or on aggregating soil. In addition, they should also be of a nontacky character and inert as to reacting with either the polyacrylate or the sorptive powder. The particle size, e. g. maximum dimension of the particle, of this material is important and the average (by weight) particle size should be greater than 10 microns. Further, not more than 20% by weight of this material should pass through a 325-mesh screen although it is desirable to have substantially all, that is at least 90% by weight, of this substance finer than 60-mesh. The recommended proportions of this flow promoting agent range from 10 to 100% of the weight of the light sorptive powder. Since the light sorptive powder is the material which tends to produce poor flow characteristics in the mixture, it is to be expected that the required weight of free flowing agent would be based upon the weight of light powder. As in the case of the light sorptive powder, it is the physical characteristics rather than chemical which determine the suitability of various materials for promoting free flowing characteristics. Ground dolomitic limestone is recommended as a flow promoter by reason of its extremely high settled bulk density, but pyrophyllites and a wide variety of other minerals may also be used.

Polyacrylate compounds, particularly higher molecular weight hydrolyzed polyacrylonitrile, have very poor doctoring characteristics during drying as they tend to stick to a drum drier and build up a number of layers before the scraping blade removes any of the dry material. It has been found that the presence of relatively minor quantities of certain surface active esters provides excellent doctoring characteristics in the mixture. Further there is a distinct possibility that upon application to soil these esters promote the dispersion of the polyacrylic compound within the soil. This group includes esters of polyoxyalkylenes or polyglycols of between 200 and 4000 molecular weight with a fatty acyl substance containing from 8 to 22 carbon atoms per acyl chain and the most desirable of these are the polyoxyalkylene 400–2500 esters. Within the molecular weight limits indicated the polyoxyalkylene radical may be obtained by the polymerization of ethylene glycol, di- and triethylene glycol, ethylene oxide, propylene oxide, 1,2-propylene glycol, 1,3-propylene glycol and the like. The resulting polyether esters include the well-known polyethylene glycol esters and in the higher molecular weight ranges the carbowax esters. The fatty acyl radical may be supplied by any suitable acylating substance such as a fatty acid, amide, acyl chloride, glyceride, etc. This radical may be either saturated or unsaturated and may contain hydroxyl groups. Among the suitable fatty acids are caprylic, lauric, palmitic, stearic, behenic, palmitoleic, oleic, ricinoleic, cetoleic acids and the like as well as mixture of such acids. Specific examples of suitable substances include, inter alia, polyethylene glycol 400 monostearate, distearate, monooleate, dioleate, dilaurate, monoricinoleate and mixed di- and triricinoleates; polyethylene glycol 600 monostearate, distearate, monooleate and dioleate; carbowax 1000 dioleate; polyoxyalkylene 1500–2500 monostearate, and carbowax 4000 dioleate. Quantities of this additive ranging from at least 0.5 part of the ester upwards should be present for each 100 parts by weight of polyacrylic compound and the preferred range is from 2 to 6 parts. Quantities of polyglycol esters in excess of 10%, for example 15% or 20% or more of the weight of the polyacrylate salt are also contemplated but these appear to offer no advantage over compositions containing smaller quantities of the ester. These esters expedite the drying of polyacrylic compounds and the effect is more pronounced in the higher molecular weight ranges for instance, above 117,500. For some unknown reason when the ester is present the polyacrylate salt is easily scraped off of the drum drier in a substantial sheet of uniform thickness. This sheet can, of course, be readily ground into powder of the proper size.

The compositions of the present invention are primarily intended for the improvement of soil structure by aggregating soil particles to improve the tilth, aeration, porosity, water absorption and holding capacity of the soil. Other benefits include minimizing or eliminating erosion resulting from crusted soil and facilitating the passage of the stems or roots of various plants and grasses through the uncrusted top layer of the soil. The quantities of material suitable for soil treatment are, of course, based on the active ingredient, the hydrolyzed polyacrylonitrile or other polyacrylate component. In general the rate of deposition of the polyacrylic constituent should vary between 10 pounds per acre for minimum noticeable effect up to a maximum of about 6000 pounds per acre and the recommended range is between 200 and 2000 pounds per acre. The mixture should be spread evenly over the surface to be treated and then mixed into the soil within 40 minutes as a general rule using a rake, disc, rotary cultivator or other available equipment. It is contemplated that the compositions described herein may be used in admixture with other substances as, for example, calcium acrylate and the like for stabilizing soil, that is, forming a tough or rubbery soil mat suitable for highways, airplane runways, earth dams and many specialized military purposes. In these instances the soil usually should be treated much more heavily and mixed more thoroughly than in the case of soil conditioning.

For these purposes it is contemplated that soil aggregating polyacrylonitrile disclosed herein may be present in amounts of 15% or more of the treated soil but for most purposes less than 5% will be ample. The compositions of the present invention may also be employed if desired as drilling mud additives for the drilling of oil wells as they can readily be worked into the muds. The quantity of agent used should correspond to the quantities of hydrolyzed polyacrylonitrile conventionally used for the same purpose.

A better understanding of the nature of the invention will be obtained by reference to the following examples which serve to illustrate the invention and are not to be construed in a limiting sense. For purposes of comparison hydrolyzed polyacrylonitrile having an average molecular weight of 241,000 (Staudinger) and produced by treatment of polyacrylonitrile with a specific viscosity of 4.1 with sodium hydroxide was employed in all examples. Unless otherwise stated, all proportions are expressed in terms of weight.

*Example A*

A dry, hydrolyzed polyacrylonitrile powder ground to a fineness so that all of the material passed through a 100-mesh screen was applied to moist, loose, workable soil by sprinkling two grams of the powdered material evenly over 50 sq. inches of soil. Within less than 1 minute the powder had completely lost its friability and turned the surface of the soil sample into a soft, sticky, taffy-like mass which was completely unworkable.

The compositions set forth in Examples 1 to 7 below were prepared by mixing the same dry, hydrolyzed polyacrylonitrile as used in Example A with various inert, high sorptive powders of low bulk densities. Upon applying the friability test of Example A with trials of the workability of soil samples being made at 10 minute intervals over a period of an hour, it was found that the mixtures of Examples 1 to 7 remained friable in every case for at least 40 minutes after application to the soil.

*Example 1*

| | Weight per cent |
|---|---|
| Hydrolyzed polyacrylonitrile | 40 |
| Dicalite IG–3 (note 1) | 60 |

NOTE 1.—A registered trademark of the Dicalite Co. for a sponge-like fresh water diatomite composed chiefly of silica. The compacted dry bulk density of this infusorial earth is 13 pound per cubic foot and the Gardner-Coleman water absorbency is 65%.

*Example 2*

| | Weight per cent |
|---|---|
| Hydrolyzed polyacrylonitrile | 40 |
| Celatom MN–35 (note 2) | 60 |

NOTE 2.—A registered trademark of the Eagle-Picher Sales Co. for a sponge-like, porous, fresh water diatomaceous earth composed chiefly of silica. This sponge-like, porous material has a surface area of 27 square meters per gram, a compacted dry bulk density of 9.0 pounds per cubic foot and the modified Gardner Coleman water absorbency amounts to 52%.

*Example 3*

| | Weight per cent |
|---|---|
| Hydrolyzed polyacrylonitrile | 40 |
| Hi Sil (note 3) | 60 |

NOTE 3.—A registered trademark of the Pittsburgh Plate Glass Co. for a product which is essentially very finely ground, synthetic, hydrated silicon dioxide. The particles are of an equant nature with an average particle size of 0.025 micron, surface area of 110 square meters per gram, a compacted dry bulk density of 7.5 pounds per cubic foot and the modified Gardner-Coleman water absorbency is over 75%.

*Example 4*

| | Weight per cent |
|---|---|
| Hydrolyzed polyacrylonitrile | 40 |
| Celite FC (note 4) | 60 |

NOTE 4.—A registered trademark of the Johns-Manville Co. for a natural, amorphous, salt water diatomaceous earth with particles of a sponge-like, porous structure. A typical analysis shows: $SiO_2$—85.7%, $Al_2O_3$—3.5%, $Na_2O$—0.8%. This material has a compacted or tapped bulk density from 14 to 17 pounds per cubic foot, a modified Gardner-Coleman water absorbency of 69%, an average particle size (Oden method) of 4 to 6 microns and a surface area of 18 to 22 square meters per gram.

Example 5

| | Weight per cent |
|---|---|
| Hydrolyzed polyacrylonitrile | 40 |
| Attaclay SF (note 5) | 60 |

NOTE 5.—A registered trademark of the Attapulgus Clay Co. for an attapulgite clay consisting essentially of complex, hydrated, aluminum and magnesium silicates in the form of rod-like laminations. It has a compacted dry bulk density of 13 to 15 pounds per cubic foot and the water absorbency is 60% by the modified Gardner-Coleman method. The average particle size is 0.4 to 0.6 micron and the surface area amounts to 120 square meters per gram.

Example 6

| | Weight per cent |
|---|---|
| Hydrolyzed polyacrylonitrile | 40 |
| Pikes Peak 9200 (note 6) | 60 |

NOTE 6.—A registered trademark of the General Reduction Co. for a montmorillonite or hydrated aluminum silicate clay with the following typical analysis: $SiO_2$—69.6%, $Al_2O_3$—14.3%, $Fe_2O_3$—3.9%, MgO—1.0%, CaO—0.8% and $Na_2O$—0.43%. The finely porous particles of this material occur as sheet-like laminations. The material has a compacted bulk density of 23.6 pounds per cubic foot, a modified Gardner-Coleman water absorbency of 50%, and an average particle size of 2 microns and a surface area of 50 square meters per gram.

Example 7

| | Weight per cent |
|---|---|
| Hydrolyzed polyacrylonitrile | 40 |
| Nytal 400 (note 7) | 60 |

NOTE 7.—A registered trademark of the R. T. Vanderbilt Co. for a product which is essentially talc or a hydrous magnesium silicate of nonporous nature with 99% by weight finer than 325-mesh and an average particle size (Fischer air permeation method) of 0.8 micron. The compacted bulk density is just under 25 pounds per cubic foot and the surface area is 9.5 square meters per gram.

Examples 8 to 13 are tabulated below and show the effect of varying proportions of acrylic polymer and one particular highly sorptive light powder as determined by the friability test of Example A which was terminated after one hour.

| Ex. | Hydrolyzed Polyacrylonitrile, Wt. percent | Isco Cel M (Note 8), Wt. percent | Time Soil Remained Friable in minutes |
|---|---|---|---|
| 8 | 10 | 90 | 60+ |
| 9 | 20 | 80 | 60+ |
| 10 | 30 | 70 | 60+ |
| 11 | 40 | 60 | 60+ |
| 12 | 50 | 50 | 40+ |
| 13 | 60 | 40 | 30+ |

NOTE 8.—A registered trademark of the Innis Speiden Co. for a hydrous form of opaline silica known as a fresh water diatomite with the following typical analysis: $SiO_2$—93.0%, $Al_2O_3$—2.3%, $Fe_2O_3$—1.56%, MgO—1.34%. Its compacted dry bulk density is between 12 and 16 pounds per cubic foot and its water absorbency is 65% by the modified Gardner-Coleman method. The particles of this material are of sponge-like nature.

After noting the relatively mediocre flowability of a number of the dry formulations above, especially in Examples 1 to 11 inclusive wherein the sorptive, light powder is the major constituent, a variety of nontacky, dense, free-flowing, powdered or granulated materials were added. In every case these agents improved the flowability of the materials as is particularly evidenced by Examples 14 and 15. To determine flowability an arbitrary test method was devised. This test consisted of measuring the time required for 70 grams of the material to flow through a 5/8" diameter orifice while subjected to constant, mild agitation. When the composition of Example 11 was subjected to the test the time of flow was observed to be 31 seconds.

Example 14

| | Weight per cent |
|---|---|
| Hydrolyzed polyacrylonitrile | 40 |
| Isco Cel M (note 8) | 44 |
| Ground pyrophyllite | 16 |

A natural hydrous aluminum silicate with the following typical analysis: $SiO_2$—75.7%, $Al_2O_3$—18.5%, CaO—3.6%, $Fe_2O_3$—0.54% and $TiO_2$—0.32%. The compacted bulk density was 72 pounds per cubic foot. 70% remained on a 250-mesh screen and 85% on a 325-mesh screen.

The above mixture was found to flow through the standard orifice in 26 seconds; this was distinctly better than the composition of Example 11 in flowability. Application of the friability test of Example A disclosed that this mixture remained friable for at least 40 minutes.

Example 15

| | Weight per cent |
|---|---|
| Hydrolyzed polyacrylonitrile | 40 |
| Isco Cel M (note 8) | 44 |
| Ground dolomitic limestone | 16 |

Compacted bulk density 116 pounds per cubic foot 100% passed through a 60-mesh screen with 40% remaining on a 100-mesh screen.

After these ingredients were thoroughly mixed, the flowability test described above was made and the time of flow through the standard orifices was observed to be 22 seconds—a striking improvement over Example 11. The superior flowability over the composition of Example 14 is attributed to the greater bulk density of the flow promoting agent. The friability test of Example A was also applied to the composition and the treated soil sample was also found to be friable for at least 40 minutes.

Example 16

| | Weight per cent |
|---|---|
| Hydrolyzed polyacrylonitrile | 42.5 |
| Celite HSC (note 9) | 5.0 |
| Carbowax 1000 dioleate (Polyethylene glycols having an average molecular weight of approximately 1000 esterified with oleic acid.) | 1.5 |
| Ground limestone | 15.0 |
| Isco Cel M (note 8) | 36.0 |

NOTE 9.—A registered trademark of the Johns-Manville Corp. for a product composed of a diatomaceous earth fluxed with soda ash and then calcined. A typical analysis shows: $SiO_2$—90.9%, $Al_2O_3$—3.7% and $Na_2O$—2.5%. This material has an average particle size of from 7 to 9 microns (Oden method) with less than 7% by weight remaining on a 150-mesh screen. The compacted bulk density is between 14 and 17 pounds per cubic foot and the modified Gardner-Coleman water absorbency is 69%.

The Celite HSC and the polyoxyalkylene ester were stirred into a 20% aqueous solution of the stated amount of hydrolyzed polyacrylonitrile. The resulting slurry was dried on a drum drier and ground finer than 100-mesh. After this the dried powder was blended with the Isco Cel M (note 8) and limestone of the size and type specified in Example 16. This constitutes the preferred formulation. It is a freely flowing powder which remains friable in contact with moist soil for at least 40 minutes when tested by the method of Example A.

Example 17

| | Weight per cent |
|---|---|
| Hydrolyzed polyacrylonitrile | 40.0 |
| Polyethylene glycol 400 monoricinoleate | 1.5 |
| Isco Cel M (note 8) | 43.5 |
| Ground limestone | 15.0 |

This mixture was prepared according to the method of Example 16 except that about 1/8 of the Isco Cel M (note 8) was added to concentrated aqueous hydrolyzed polyacrylonitrile along with the ester. The balance of the diatomaceous earth and limestone were later blended with the dried powder. This also was a free-flowing mixture which remained friable for at least 40 minutes when tested as in Example A.

Example 18

| | Weight per cent |
|---|---|
| Hydrolyzed polyacrylonitrile | 40.0 |
| Carbowax 1500 monostearate | 1.5 |
| Celatom MN-35 (note 2) | 58.5 |

The above composition was prepared according to the method of Example 16 except that 1/12 of the Celatom MN-35 (note 2) was added to the concentrated aqueous hydrolyzed polyacrylonitrile along with the Carbowax ester. After this slurry had been dried and ground the balance of the diatomaceous earth was blended with the powder. The friability of this agent was substantially the same as that of Example 2.

It will, of course, be understood that the present invention contemplates not only the various materials mentioned above but also any other substances which are compatible with the materials set forth herein. Thus fertilizers, weed killers, insecticides and other materials used in treating soil may be added as desired to perform their usual functions and the same is true of other additives used in connection with oil well drilling muds to cite only two examples.

Having described our invention what we claim as new and desire to secure by Letters Patent is:

1. A composition of matter which comprises a mixture of 100 parts by weight of a reaction product having a molecular weight above about 88,000 of a monovalent base having a dissociation constant no smaller than $1.8 \times 10^{-5}$ with a polymer of a compound of the group consisting of acrylic acid, acrylonitrile, acrylamide and lower alkyl acrylates, at least 50 parts of a nontacky inert powder of high sorptive power having a water absorbency of at least 42 percent by weight and a compacted dry bulk density less than 30 pounds per cubic foot, and a polyoxyalkylene 200–4000 ester of a fatty acyl substance containing from 8 to 22 carbon atoms per acyl chain.

2. A composition according to claim 1 in admixture with an amount sufficient to produce a free-flowing mixture of an inert nontacky free-flowing solid material having a compacted dry bulk density greater than 30 pounds per cubic foot and an average particle size greater than 10 microns with substantially all of the particles thereof finer than 60-mesh and less than 20 percent by weight finer than 325-mesh.

3. A composition of matter which comprises a finely divided solid mixture of 100 parts by weight of hydrolyzed polyacrylonitrile obtained by hydrolyzing polyacrylonitrile having a specific viscosity above about 1.5 with a monovalent base having a dissociation constant no smaller than $1.8 \times 10^{-5}$, at least 50 parts of a nontacky inert powder of high sorptive power having a water absorbency of at least 50 percent by weight and a compacted dry bulk density less than 25 pounds per cubic foot, and between 2 and 6 parts of a polyoxyalkylene 400–2500 ester of a fatty acyl substance containing from 8 to 22 carbon atoms per acyl chain.

4. A composition according to claim 3 in admixture with between about 10 and about 100 percent, based on the weight of said powder, of an inert nontacky free-flowing solid material having a compacted bulk density greater than 45 pounds per cubic foot and an average particle size greater than 10 microns with substantially all of the particles finer than 60-mesh and less than 20 per cent by weight finer than 325-mesh.

5. A composition according to claim 3 in which said powder is a diatomaceous earth.

References Cited in the file of this patent

UNITED STATES PATENTS

| | | |
|---|---|---|
| 2,317,328 | Kinney | Apr. 20, 1942 |
| 2,552,775 | Fischer et al. | May 15, 1951 |
| 2,651,883 | Hedrick et al. | Sept. 15, 1953 |

FOREIGN PATENTS

| | | |
|---|---|---|
| 501,726 | Belgium | Mar. 7, 1951 |